Figure 1:
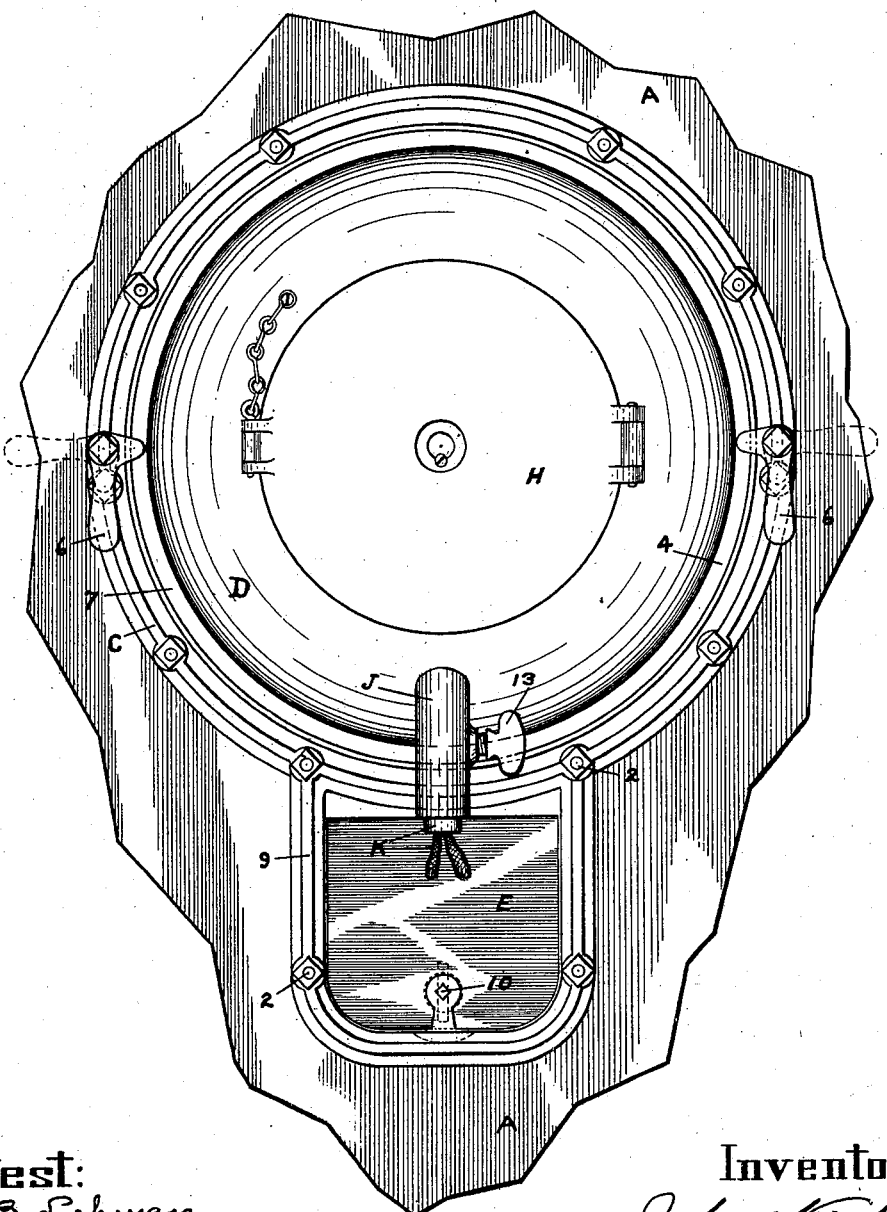

No. 721,647. PATENTED FEB. 24, 1903.
J. KIRBY, Jr.
HEADLIGHT.
APPLICATION FILED MAY 5, 1902.
NO MODEL. 3 SHEETS—SHEET 1.

Attest: Inventor.

No. 721,647. PATENTED FEB. 24, 1903.
J. KIRBY, Jr.
HEADLIGHT.
APPLICATION FILED MAY 5, 1902.
NO MODEL. 3 SHEETS—SHEET 2.
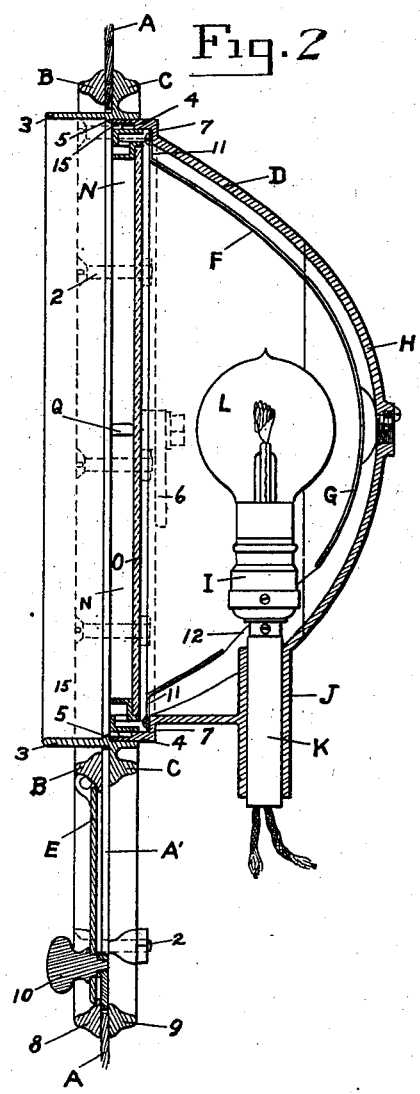
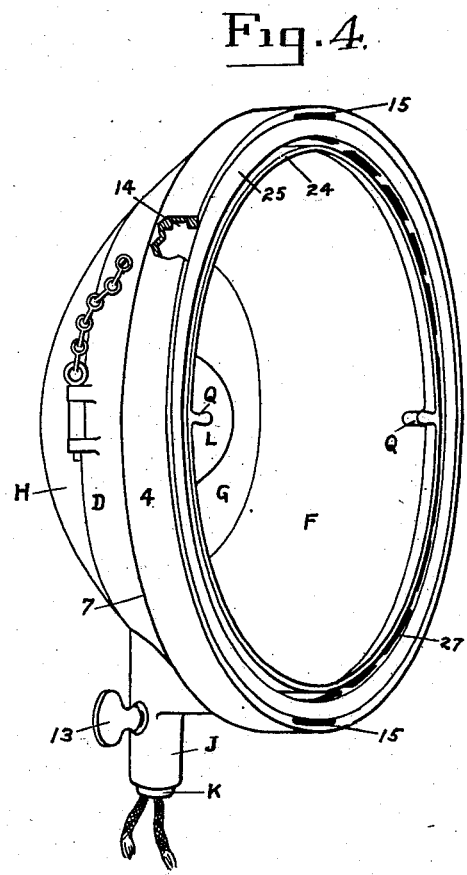
Attest:
E. B. Lehman
Fred E. Keeley
Inventor.
John Kirby Jr

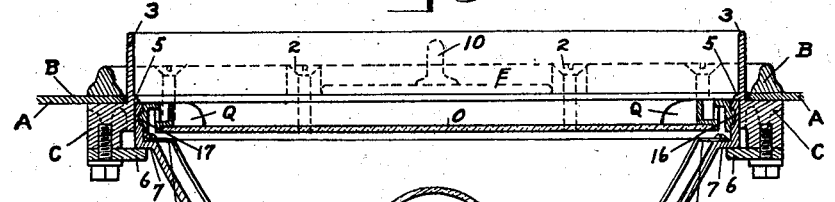

UNITED STATES PATENT OFFICE.

JOHN KIRBY, JR., OF DAYTON, OHIO, ASSIGNOR TO UNITED STATES HEADLIGHT COMPANY, OF BUFFALO, NEW YORK, A CORPORATION OF NEW YORK.

HEADLIGHT.

SPECIFICATION forming part of Letters Patent No. 721,647, dated February 24, 1903.

Original application filed December 26, 1901, Serial No. 87,238. Divided and this application filed May 5, 1902. Serial No. 105,999. (No model.)

*To all whom it may concern:*

Be it known that I, JOHN KIRBY, Jr., a citizen of the United States, residing in the city of Dayton, county of Montgomery, and State of Ohio, have invented certain new and useful Improvements in Headlights; and I do hereby declare the following to be a clear, full, and exact description of the invention, such as will enable others skilled in the art to which it appertains to make and use the same, reference being had to the accompanying drawings, and to the characters of reference marked thereon, which form a part of this specification.

My invention contemplates certain new and useful improvements in headlights, and more particularly electric headlights for use on electric-railway cars and other vehicles, and it has special reference to the construction disclosed in an application filed by me for a similar invention on the 26th day of December, 1901, Serial No. 87,238, of which this application is in part a division and to which cross-reference is here made.

The objects of my present invention are, first, to provide improved means for attaching the headlight to the dashboard of a railway-car or other vehicle, whereby the headlight will be securely held in position thereon without projection beyond the front side thereof; second, to provide improved means whereby the headlight can be quickly secured in position or removed therefrom; third, to so improve upon the general construction of headlights adapted to be mounted in or opposite a hole or opening in the dashboard that access can be had to the interior thereof for the purpose of manipulating the lamp or cleaning the reflector from the back of the headlight; fourth, to provide means of access to the back of the headlight from the front of the dashboard through an opening therein for convenience in adjusting the lamp and otherwise manipulating the headlight, and, fifth, to so combine the aforesaid objects as that they shall be adapted to various types of headlights, the said objects being accomplished by new and novel combinations which will be hereinafter fully described and claimed and which are clearly illustrated in the accompanying drawings, forming a part hereof, and in which—

Figure 1 represents a rear view of the dashboard of a railway-car with my improved headlight mounted thereon; Fig. 2, a vertical section through the center of the headlight and dashboard; Fig. 3, a horizontal section through the center line of the headlight and dashboard, the back door of the case being shown partly open; Fig. 4, a front perspective broken view of the headlight removed from the dashboard; Fig. 5, a broken perspective view of the glass-holder; Fig. 6, a rear perspective view of a portion of the glass-holder and front projecting ring of the case, showing one of the clips for holding the glass in position and also the manner in which the glass-holder is secured within the front projecting ring; and Figs. 7 and 8, modifications in the manner of attaching the headlight to the dashboard.

For the purpose of illustrating my present invention I have selected a headlight in which electricity is employed as an illuminant, the lamp being of the incandescent type, while the adaptation of the invention to lamps of the electric-arc type is shown and described in the said application Serial No. 87,238. It will be apparent, however, that certain features of the invention are also applicable to headlights in which gas or oil is used for illumination.

In the drawings similar letters and figures of reference indicate corresponding parts throughout.

A represents a portion of the dashboard in which there is formed an opening which in size approximates that of the open front of the headlight. B represents a collar surrounding the said opening on the outside of the dashboard, and C a dash-ring surrounding the opening on the inside thereof. The collar B and the dash-ring C are each provided with holes which register with corresponding holes in the dashboard to receive bolts 2, by which they are clamped to the dashboard, as clearly shown in Figs. 1 and 2. The dash-ring C is provided with a horizontally-disposed flange or rim 3, which extends rearwardly from the dashboard and which is also preferably made to extend through the said opening and out beyond the collar B, thus contributing stiffness to the ring and forming a finish around the opening.

D represents the headlight-case, which is formed with an open front and an opening in the back thereof and preferably cast in a single piece of any suitable material to the form shown, there being formed thereon a front projecting ring 4, adapted to engage the dash-ring C and stop against a shoulder 5, formed on the inside thereof, preferably in line with the inside of the dashboard, the case being secured in such position by rotatable fasteners 6, attached to the dash-ring C and adapted to engage behind a shoulder 7 on the body of the case. Thus when it is desired to remove the headlight the said fasteners are swung to the positions shown by dotted lines in Fig. 1, when it will be free to be removed for placement in another car or for any other purpose desired without the necessity of removing the bolts 2, collar B, and dash-ring C. It will be apparent, however, that the dash-ring C may be formed upon or integral with the body of the case, in which event it would be necessary to remove the bolts in order to free the headlight from its mountings, such construction being shown in Fig. 8.

When a headlight is mounted upon the dashboard of a railway-car in such manner that the lamp thereof is in the rear of the dashboard, it is desirable, as matters of convenience and economy, that certain parts of the lamp mechanism be accessible from both the front and rear of the dashboard without disturbing the glass-holder or removing the headlight, and in order to obtain access to the adjusting parts of the lamp from in front of the dashboard I provide an armhole A', Fig. 2, through the latter, whereby the lamp can be manipulated from in front of the dashboard, as will presently appear, and in the performance of which act the operator can see into the open front of the headlight to adjust the lamp to its proper position with relation to the focal point of the reflector, provision for obtaining access to the interior of which from the back of the headlight will be hereinafter explained. To form a finish to the said armhole, as well as to stiffen the structure, the collar B and dash-ring C are each provided with continuations 8 and 9, which extend around the armhole, and on the outside, preferably, is hinged a door E for closing the opening, which is a trifle smaller than the door, thus forming a jamb for the latter to close against, the door being fastened by a latch 10.

Within the case D there is located a parabolically-formed reflector F, provided with an outwardly-turned flange 11, by which it may be secured in place in the usual manner. The back of this reflector is cut away, and it is therefore open at both ends, as more clearly shown in Fig. 3, the parabola being completed by an auxiliary reflector G, secured to a door H, hinged to the body of the case and forming the back thereof in the manner shown, or it may be secured in any other manner which will effectually accomplish its purpose, although in practice I have found the simpler and more efficient plan of mounting this auxiliary reflector to be to attach it to the door, as shown, whereby when the latter is opened the former will be carried with it, and the opening in the back of the main reflector will then be exposed for the purpose of cleaning the reflector, replacing, or otherwise manipulating the lamp from the back of the headlight. The normal relative positions of the two reflectors will be established when the said door is closed, an opening 12 being provided for the passage of a lamp-socket I into the reflector. It will be apparent, however, that a single reflector located behind the lamp may in some cases be employed in lieu of the two reflectors just described.

In the wall of the case and by preference integral therewith, opposite the focal point of the reflector, there is formed a hollow sleeve J, which supports a vertically-movable socket-holder K, adapted to carry at its upper end the said lamp-socket, which supports an incandescent lamp L. A thumb or setscrew 13 serves to hold the said socket-holder in position in the said hollow sleeve, and the same can be operated from the front side of the dashboard through the said armhole to adjust the lamp to the focal point of the reflector.

The inside of the front ring 4 of the case is provided with a circumferential groove 14, into which lateral channels 15 lead from its outer edge. A glass-holder N is held within the said ring 4, being secured therein by means of lugs 16 and 17, projecting from its outer horizontal surface and adapted to enter the channels 15, whereupon by turning the glass-holder they will engage the groove 14 and retain the holder within the said projecting ring of the case, from whence it can be withdrawn only upon turning it back to the position where the said lugs register with the said channels. It is obvious, however, that instead of the groove 14 extending around the ring, as above described, a single short groove may extend from each of the channels in either direction; but as a convenience of manufacture I prefer the construction shown and in which at a suitable distance from the said channels is provided a stop 18, against which one of the lugs will strike, and further forward movement of the holder will be thereby arrested, the holder being prevented from undue reverse movement and possible displacement by a spring 19, one end of which is secured to and on the under side of the outer horizontal member 20 of the glass-holder, the opposite end having a projecting pin 21 with beveled end and operative through the lug 17, the beveled end of the pin engaging a perforation 22 in the ring 4 of the case, as more clearly shown in Fig. 6. Thus the pressure of the spring must be overcome before the holder can be released, and while this is easily accomplished by the hand of an operator the pressure of the spring is sufficient to prevent any jarring motion, to which headlights in service are subjected, from displacing the glass-holder. The glass-holder is composed of the outer horizontal member 20, previously referred to, intermediate and inner horizontal members 23 and 24, and vertical members 25 and 26, as shown, the horizontal member 23 being provided with a series of air-openings 27, a drainage-opening 28 being provided through the outer horizontal member at the bottom thereof. On the outside of the said glass-holder opposite the intermediate member 23 is an outwardly-projecting ring or collar 29, which encircles a glass disk O, held therein by several clips 30, one end of each of which is secured to a post P by screws 31, the holder being also provided with finger-pieces Q for convenience in handling.

It is obvious that the details of construction as herein described may be modified in various ways without departing from the spirit of my invention. Therefore I do not wish to limit my invention to such exact construction.

Having thus fully described my invention, I claim—

1. The combination with the dashboard of a railway-car having an opening therein, of a dash-ring secured to the dashboard around the said opening provided with a rearwardly-extending horizontally-disposed rim, a headlight-case having a front projecting ring adapted to engage the said rim from the rear of the dashboard, and means whereby the case is secured therein.

2. The combination with the dashboard of a railway-car having an opening therein, of a dash-ring secured to the dashboard around the said opening provided with a rearwardly-extending horizontally-disposed rim, a headlight-case having a front projecting ring adapted to engage the said rim from the rear of the dashboard, and means whereby the case is detachably secured therein.

3. The combination with the dashboard of a railway-car having an opening therein, of a dash-ring secured to the dashboard on the inside thereof around the said opening and having a horizontally-disposed rim projecting through and beyond the front and rear of the dashboard, a headlight-case having a front projecting ring adapted to engage the said rim from the rear of the dashboard, and means whereby the case is secured therein wholly in the rear of the front side of the dashboard.

4. The combination with the dashboard of a railway-car having an opening therein, of a dash-ring secured to the dashboard on the inside thereof around the said opening and having a horizontally-disposed rim projecting through and beyond the front and rear of the dashboard, a headlight-case having a front projecting ring adapted to engage the said rim from the rear of the dashboard, and means whereby the case is detachably secured therein wholly in the rear of the front side of the dashboard.

5. The combination with the dashboard of a railway-car having an opening therein, of a dash-ring secured to the dashboard on the inside thereof around the said opening provided with a rearwardly-extending horizontally-disposed rim, a collar secured to the dashboard on the outside thereof around the said opening, a headlight-case having a front projecting ring adapted to engage the said rim from the rear of the dashboard, and means whereby the case is secured therein.

6. The combination with the dashboard of a railway-car having an opening therein, of a dash-ring secured to the dashboard on the inside thereof around the said opening provided with a rearwardly-extending horizontally-disposed rim, a collar secured to the dashboard on the outside thereof around the said opening, a headlight-case having a front projecting ring adapted to engage the said rim from the rear of the dashboard, and means whereby the case is detachably secured therein.

7. The combination with the dashboard of a railway-car having an opening therein, of a dash-ring secured to the dashboard on the inside thereof around the said opening provided with a rearwardly-extending horizontally-disposed rim, a collar secured to the dashboard on the outside thereof around the said opening, a headlight-case having a front projecting ring adapted to engage the said rim from the rear of the dashboard, a glass-holder carried by the said ring on the inside and substantially flush with the face thereof, and means whereby the case is secured therein.

8. The combination with the dashboard of a railway-car having an opening therein, of a dash-ring secured to the dashboard on the inside thereof around the said opening provided with a rearwardly-extending horizontally-disposed rim, a collar secured to the dashboard on the outside thereof around the said opening, a headlight-case having a front projecting ring adapted to engage the said rim from the rear of the dashboard, a glass-holder carried by the said ring on the inside and substantially flush with the face thereof, and means whereby the case is detachably secured therein.

9. The combination with the dashboard of a railway-car having an opening therein, of a dash-ring secured to the dashboard on the inside thereof around the said opening, a headlight-case separable from and adapted to receive said dash-ring and having a front projecting ring provided with one or more grooves on the inside thereof, channels extending from the face of said ring into said groove or grooves a glass-holder having lugs adapted to enter said channels and said groove or grooves, and to traverse the latter, and means whereby said lugs are held in place in said groove or grooves.

10. The combination with the dashboard of a railway-car having an opening therein, of a dash-ring secured to the dashboard on the inside thereof around the said opening and having a rim projecting through and beyond the front of the dashboard, a headlight-case separable from and adapted to engage said dash-ring and having a front projecting ring, a glass-holder carried by the said ring on the inside and substantially flush with the face thereof, and means whereby the case is secured to said dash-ring in the rear of the front side of the dashboard.

11. The combination with the dashboard of a railway-car having an opening therein, of a dash-ring secured to the dashboard on the inside thereof around the said opening and having a rim projecting through and beyond the front of the dashboard, a headlight-case separable from and adapted to engage said dash-ring and having a front projecting ring, a glass-holder carried by the said ring on the inside and substantially flush with the face thereof, and means whereby the case is detachably secured to said dash-ring in the rear of the front side of the dashboard.

12. A headlight-case provided with a front projecting ring having one or more grooves on the inside thereof, channels extending from the face of said ring into said groove or grooves, a glass-holder having a rearwardly-projecting ring adapted to enter said projecting ring of said case, lugs on said glass-holder adapted to engage said channels and said groove or grooves and to traverse the latter, in combination with the dashboard of a railway-car having an opening therein, a dash-ring secured to the rear side of said dashboard around the said opening and separable from but adapted to receive the said ring of the case, a collar secured to the outside of said dashboard around the said opening, and means for securing the case within the said dash-ring.

13. A headlight-case provided with a front projecting ring having one or more grooves on the inside thereof, channels extending from the face of said ring into said groove or grooves, a glass-holder having a rearwardly-projecting ring adapted to enter the said projecting ring of the case, lugs on said glass-holder adapted to engage said channels and said groove or grooves and to traverse the latter, in combination with the dashboard of a railway-car having an opening therein, a dash-ring secured to the rear side of said dashboard around the said opening and separable from but adapted to receive the said ring of the case, a collar secured to the dashboard on the outside thereof around the said opening, and means for detachably securing the case within the said ring.

14. A headlight-case provided with a front projecting ring having one or more grooves on the inside thereof, channels extending from the face of said ring into said groove or grooves, a glass-holder having a rearwardly-projecting ring adapted to engage said projecting ring of the case, lugs on said glass-holder adapted to engage said channels and said groove or grooves and to traverse the latter, in combination with the dashboard of a railway-car having an opening therein, a dash-ring secured to the rear side of said dashboard around the said opening and separable from but adapted to receive the said ring of the case, and means for securing the case therein.

15. A headlight-case provided with a front projecting ring having one or more grooves on the inside thereof, channels extending from the face of said ring into said groove or grooves, a glass-holder having a rearwardly-projecting ring adapted to enter said projecting ring of the case, lugs on said glass-holder adapted to engage said channels and said groove or grooves and to traverse the latter, in combination with the dashboard of a railway-car having an opening therein, a dash-ring secured to the rear side of said dashboard around said opening and separable from but adapted to receive the said ring of the case, and means for detachably securing the case therein.

16. In a headlight, a case having an open front and a front projecting ring, in combination with a glass-holder formed in a single piece carried by said ring and having three horizontal members of different diameters united by two vertical members of different diameters, the middle of said horizontal members being provided with a series of air-perforations therethrough.

17. The combination with the dashboard of a railway-car having an opening therein, of an armhole through the dashboard adjacent to said opening, a dash-ring secured to the dashboard around the said opening and extending around the said armhole, a headlight-case carried by the said dash-ring and having an opening in the back thereof, and a door for closing the said opening in the back of the case, whereby access can be had to the interior of the headlight from the front of the dashboard through the said armhole and opening in the back of the case.

18. The combination with the dashboard of a railway-car having an opening therein, of an armhole through the dashboard adjacent to said opening, a dash-ring secured to the dashboard around the said opening and extending around the said armhole, a collar extending around the said opening and around the said armhole secured to the dashboard opposite the said dash-ring, a headlight-case carried by the said dash-ring and having an opening in the back thereof, and a door for closing the said opening in the back of the case, whereby access can be had to the interior of the headlight from the front of the dashboard through the said armhole and opening in the back of the case.

19. In a headlight, the combination of a case having an open front and an opening in the back of the case, a door for closing the said opening, a hollow sleeve formed in the wall of the case, a socket-holder operative in said hollow sleeve, a socket carried by said holder, a lamp held in said socket, a fastening device for securing the said holder in said hollow sleeve, a reflector located behind the lamp, and means whereby the said reflector is shifted from its normal position by the opening of said door whereby access to the lamp can be had.

20. The combination with the dashboard of a railway-car, of an opening in the dashboard adapted to receive a headlight, an armhole through the dashboard adjacent to said opening, a dash-ring secured to the dashboard around the said opening and extending around the said armhole, and a headlight-case mounted upon the dashboard in register with said opening.

21. The combination with the dashboard of a railway-car, of an opening in the dashboard adapted to receive a headlight, an armhole through the dashboard adjacent to said opening, a dash-ring secured to the dashboard around the said opening and around the said armhole, a collar extending around the said opening and around the said armhole secured to the dashboard opposite the said dash-ring, and a headlight-case mounted upon the dashboard in register with the said opening.

22. In a headlight, the combination of a case having an open front and an opening in the back of the case provided with a door for closing the said opening, a lamp located within the case, a reflector whose normal position is behind the lamp, and means whereby the reflector can be shifted to permit of access to the lamp from the back of the case.

23. In a headlight, the combination of a case having an open front and an opening in the back of the case provided with a door for closing the said opening, a lamp located within the case, a reflector whose normal position is behind the lamp, and means whereby the said reflector is shifted from and to its normal position by the opening and closing of the said door whereby access to the lamp can be had from the back of the case.

24. In a headlight, the combination of a case having an open front and an opening in the back of the case, a main reflector open at both ends secured within the case, a door for closing the said opening in the back of the case, an auxiliary reflector located behind the said main reflector substantially opposite the said door and arranged to be readily removed from and placed in position whereby access can be had to the said main reflector through the said opening in the rear end thereof.

25. In a headlight, the combination of a case having an open front and an opening in the back of the case, a hollow sleeve formed in the wall of the case, a socket-holder supported in said sleeve, a lamp-socket carried by said socket-holder, a lamp supported in said socket, a main reflector open at both ends secured within the case, a door for closing said opening in the back of the case, an auxiliary reflector located behind said main reflector and arranged to be readily removed and replaced in position whereby access can be had to the lamp and to the main reflector through the opening in the rear end thereof.

26. In a headlight, the combination of a case having an open front and an opening in the back of the case, a main reflector open at both ends secured within the case, a door for closing the said opening in the back of the case, and an auxiliary reflector located behind the said main reflector and adapted to substantially close the opening in the rear thereof, the said auxiliary reflector being carried by and arranged to open and close with said door.

In testimony whereof I hereunto subscribe my name this 2d day of May, 1902.

JOHN KIRBY, Jr.

Witnesses:
N. EMMONS, Jr.,
JNO. I. UNDERWOOD.